United States Patent

Plotnikoff

[15] 3,689,643

[45] Sept. 5, 1972

[54] COMBINATION OF L-DOPA, 2-IMINO-5-PHENYL-4-OXAZOLIDINONE AND AN ALUMINUM OR ALKALINE EARTH METAL SALT OR BASE USED TO TREAT PARKINSON'S DISEASE

[72] Inventor: Nicholas Peter Plotnikoff, Lake Bluff, Ill.

[73] Assignee: Abbott Laboratories, North Chicago, Ill.

[22] Filed: Jan. 27, 1971

[21] Appl. No.: 110,256

Related U.S. Application Data

[63] Continuation-in-part of Ser. No. 92,166, Nov. 23, 1970, abandoned.

[52] U.S. Cl. ...............424/157, 424/153, 424/154, 424/272, 424/319

[51] Int. Cl. ...............................................A61k 27/00

[58] Field of Search.......424/153, 153, 157, 272, 319

[56] References Cited

UNITED STATES PATENTS 3,348,999 10/1967 Woroch et al. ............424/272
3,557,292 1/1971 Bartholini.................424/327

*Primary Examiner*—Stanley J. Friedman
*Attorney*—Robert L. Niblack

[57] ABSTRACT

Covers a composition comprising the combination of l-dopa, 2-imino-5-phenyl-4-oxazolidinone or salt thereof and a third agent comprising an aluminum or alkaline earth metal salt or base and use of said composition in treating Parkinson's disease.

7 Claims, No Drawings

COMBINATION OF L-DOPA, 2-IMINO-5-PHENYL-4-OXAZOLIDINONE AND AN ALUMINUM OR ALKALINE EARTH METAL SALT OR BASE USED TO TREAT PARKINSON'S DISEASE

CROSS REFERENCE TO RELATED APPLICATIONS

This application is a continuation-in-part of copending application U.S. Ser. No. 92,166, filed Nov. 23, 1970 now abandoned.

BACKGROUND OF THE INVENTION

Parkinsonism is generally characterized by involuntary tremors, diminished motor power and rigidity. The onset of the disease is insidious, with increasing rigidity or tremor or both. The patient's facial expression may be fixed or less mobile than normal; smiling spreads and slowly disappears. Body movements generally become slower. There may be gradually increased rigidity with diminished swaying of the arms during walking. Generally, the patient's legs may begin to feel stiff and excessive effort may be required to lift them from the ground while walking. Patients often assume a stooping posture and shuffle rather than walk. As the disease progresses, movements such as adjusting a tie, buttoning a coat, etc., become impossible.

The disease is usually slowly progressive and patients may live for many years. However, with increased disability, patients often become depressed, anxious, and emotionally disturbed. While treatment with various drugs such as anti-spasmodics, central nervous system stimulants and the like have been used alone or in combination to produce temporary amelioration of complaints. 1-dopa was the first effective single agent in the treatment of the disease.

1-dopa has been reported to be effective against the akinesia and rigidity of Parkinsonism, particularly in extremely severe cases. An increase in mental alertness and wakefulness, relief from depression and an increase in intellect has also been observed.

While 1-dopa has produced some rather promising results in experimental therapy, in some instances it does not show benefits unless used in relatively large amounts. This causes undesirable side effects such as nausea, vomiting, hypotension and abnormal involuntary movements as well as mental changes.

It would, therefore, be a significant advance in the art if some means of potentiating 1-dopa were found whereby the resultant new composition could be used to effectively treat Parkinson's disease at relatively low dosage levels, and thus the above unwanted side effects as well as others are avoided.

SUMMARY OF THE INVENTION

It, therefore, becomes an object of the invention to provide a composition useful in treating Parkinsonism. A specific object of the invention is to provide a method of treating Parkinsonism with a drug exhibiting a low level of side effects, if any, and which does not become tolerated over extended usage. Essentially the invention here is concerned with a composition useful in treating Parkinson's disease, said composition comprising in combination 1-dopa, 2-imino-5-phenyl-4-oxazolidinone or salt thereof and an aluminum or alkaline earth metal salt or base.

DETAILED DESCRIPTION OF THE INVENTION

In brief, compositions found here to possess activity against Parkinson's disease include the combination of 1-dopa, 2-imino-5-phenyl-4-oxazolidinone or salt thereof and an aluminum or alkaline earth metal salt or base.

Typical bases or salts include aluminum, magnesium and calcium carbonates, hydroxides, sulfates, chlorides, bicarbonates, phosphates, citrates, thiosulfates, iodides, bromides, carbonate-hydroxides, acetates, propionates, lactates, benzoates, tartrates, etc. Most preferred are magnesium salts and bases such as magnesium hydroxide, magnesium sulfate, magnesium chloride.

A typical composition found useful here in treating Parkinson's disease is formed by combining 1-dopa with one or more of the above salts or bases and oxazolidinone whereby there is present at least 0.05 mole or base or salt to 1 mole of the 2-imino-5-phenyl-4-oxazolidinone compound. A particularly useful composition comprises the combination of 1-dopa and equimolar amounts of oxazolidinone and magnesium hydroxide.

For use in treating Parkinson's disease, the above composition may be administered in either liquid or solid form. Thus, the active compounds may be provided in granulation, tablet, capsule, elixir and other dosage forms. Oral administration is preferred and is the most convenient. Other means of administration may be employed such as, for example, by intraperitoneal or intramuscular injection. The active ingredients can also be incorporated in an oil or wax base and administered in the form of suppository.

When administered in a unit dosage form, the active ingredients comprising 1-dopa, oxazolidinone and base or salt will be present in a total amount of 5–100 milligrams, more often 5–50 milligrams accompanied by a pharmaceutically acceptable carrier.

The compositions of the invention are found to be effective in humans at a dosage range of from about 0.1 to about 400 mg./kg. of body weight daily. More often the dose is 1–200 mg./kg.

EXAMPLE I

One basic approach for evaluation of anti-Parkinson activity is estimating reversal of the extrapyramidal effects of deserpidine which depletes biogenic amines in animals and in man, which test was employed here.

Specifically, deserpidine was administered to mice 24 hours prior to the test at a lever of 50 mg./kg. The deserpidine was administered orally.

Twenty-four hours after administering the deserpidine, 1-dopa was then given by intraperitoneal injection at 100 mg./kg. The 1-dopa had no effect in reversing the effects of deserpidine. It was given a rating of 0. In this test a rating of 0 indicates no effect; a rating of 1 indicates slight effect; a rating of 2 indicates moderate effect and a rating of 3 indicates marked effect.

When a combination treatment involving 1-dopa, 2-imino-5-phenyl-4-oxazolidinone, and magnesium hydroxide was employed, definite reversal of the deserpidine effects were noted. Specifically, a mixture of 2-imino-5-phenyl-4-oxazolidinone and magnesium hydroxide (75.3 percent and 24.7 percent by weight, respectively) was prepared in suspension form and administered to mice orally. At the same time 1-dopa was also injected intraperitoneally at various dosages. Table I shows the results of this test, and specifically points out the definite potentiation of 1-dopa by the combination of oxazolidinone and magnesium hydroxide.

TABLE I

| 2-imino-5-phenyl-4-oxazolidinone and magnesium hydroxide | 1-dopa | Rating |
|---|---|---|
| 2.5 mg./kg. | 100 mg./kg. | 0 |
| 5 mg./kg. | 100 mg./kg | 1 |
| 10 mg./kg. | 100 mg./kg. | 1 |
| 25 mg./kg. | 100 mg./kg. | 2 |
| 50 mg./kg. | 100 mg./kg. | 3 |
| 100 mg./kg. | 100 mg./kg. | 3 |

EXAMPLE II

In this series of tests, the compositions of the invention were evaluated as to their reversal of deserpidine effect wherein Rhesus monkeys were the animals treated here. Eighteen hours prior to the test the monkeys were given 20 mg./kg of deserpidine orally. Eighteen hours after this administration, 1-dopa was administered alone orally at a level of 10 mg./kg. No effect upon deserpidine symptoms was noted with use of 1-dopa here.

As in Example I, use of 2-imino-5-phenyl-4-oxazolidinone and magnesium hydroxide markedly potentiates the effects of 1-dopa. Specifically, 1 mg./kg. of oxazolidinone and magnesium hydroxide (75.3 percent and 24.7 percent by weight, respectively) was orally administered along with 10 mg./kg. of 1-dopa. Complete reversal of the deserpidine effects was now realized. That is, the sedative effects of deserpidine were completely reversed by use of the combination of chemicals.

While in the above examples 1-dopa and the combination of 2-imino-5-phenyl-4-oxazolidinone and magnesium hydroxide were administered separately, it is understood, of course, that the three materials may be combined and administered at one time.

The amount of 1-dopa in combination with the oxazolidinone and base or salt will vary depending on the patient's needs. Normally, the ratio of 1-dopa to the combination of oxazolidinone and base or salt will vary from 1 part of 1-dopa to 1 part of oxazolidinone and base or salt to 30 parts of 1-dopa to 1 of oxazolidinone and base or salt, and more often the ratio ranges from 1:1 to 20:1. It is understood, of course, that in addition to use of the above salts or bases in combination with 2-imino-5-phenyl-4-oxazolidinone and 1-dopa, salts of the oxazolidinone compound may also be employed here. This particular oxazolidinone is a relatively weak acid, and therefore salts may be formed via combination with a strong base. For example, alkali metal salts may be formed such as the sodium, lithium, etc. salts. In addition alkaline earth metal salts such as the calcium salt may also be formed. Normally, these salts are formed by reacting the oxazolidinone with a strong alkali metal or alkaline earth metal base or anhydride such as sodium hydroxide, potassium hydroxide, lithium hydroxide, calcium hydroxide etc., or sodium hydride, calcium hydride.

What is claimed is:

1. A method of treating a patient suffering from Parkinson's disease comprising administering to said patient at least an effective dosage of a composition comprising in combination 2-imino-5-phenyl-4-oxazolidinone or a pharmaceutically acceptable salt thereof, 1-dopa, and a third potentiating agent comprising a base or salt selected from the group consisting of an aluminum base, an aluminum salt, an alkaline earth metal salt, and an alkaline earth metal base, said potentiating agent being combined in a ratio at least 0.05 mole of potentiating agent to 1 mole of 2-imino-5-phenyl-4-oxazolidinone, and said 1-dopa being combined in ratio of 1–30 parts of 1-dopa to 1 part of oxazolidinone and base or salt.

2. The method of claim 1 wherein said third agent is magnesium hydroxide.

3. The method of claim 1 wherein said dosage range is from about 0.1 to about 400 mg./kg. of body weight daily.

4. The method of claim 3 wherein said dosage range is 0.1–200 mg./kg.

5. The method in claim 1 wherein said composition is administered in a unit dosage form in a pharmaceutically acceptable carrier, said carrier comprising a major portion of said dosage form.

6. A pharmaceutical composition in unit dosage form effective against Parkinson's disease which comprises an active portion comprising in combination 5–100 milligrams of 1-dopa, 2-imino-5-phenyl-4-oxazolidinone and a third potentiating agent comprising a base or salt selected from the group consisting of, an aluminum base, an aluminum salt, an alkaline earth metal salt and an alkaline earth metal base, and a pharmaceutically-acceptable carrier, said potentiating agent being combined in a ratio of least 0.05 mole of potentiating agent to 1 mole of 2-imino-5-phenyl-4-oxazolidinone, and said 1-dopa being combined with said oxazolidinone and said base or said salt in a ratio of 1–30 parts of 1-dopa to 1 part of oxazolidinone and base or salt.

7. The composition of claim 6 wherein said base is magnesium hydroxide.

* * * * *